United States Patent [19]

Ogura

[11] 4,008,426
[45] Feb. 15, 1977

[54] ELECTRONIC SPEED CONTROL SYSTEMS FOR MINIATURE DIRECT CURRENT MOTORS

[75] Inventor: Makoto Ogura, Kawasaki, Japan
[73] Assignee: Jeco Co., Ltd., Kawasaki, Japan
[22] Filed: Nov. 20, 1975
[21] Appl. No.: 633,869

[30] Foreign Application Priority Data

| Nov. 28, 1974 | Japan | 49-143050[U] |
|---|---|---|
| Jan. 14, 1975 | Japan | 50-7201[U] |
| Feb. 18, 1975 | Japan | 50-21499[U] |
| Feb. 20, 1975 | Japan | 50-22493[U] |
| June 3, 1975 | Japan | 50-74293[U] |
| Nov. 5, 1975 | Japan | 50-133437 |

[52] U.S. Cl. .................. 318/331; 318/345 R
[51] Int. Cl.² ................................ H02P 7/00
[58] Field of Search ............ 318/331, 345, 345 F

[56] References Cited
UNITED STATES PATENTS

| 3,335,350 | 8/1967 | Persson | 318/345 |
| 3,422,231 | 1/1969 | Kearns | 318/345 |
| 3,777,244 | 12/1973 | Kosaka | 318/331 |
| 3,838,324 | 9/1974 | Watanabe | 318/345 |

*Primary Examiner*—Benjamin Dobeck
*Attorney, Agent, or Firm*—Charles E. Pfund

[57] ABSTRACT

A miniature DC motor is connected to a DC source through a PNP type driving transistor. The back electromotive force of the motor which is proportional to the speed is applied to the base electrode of an NPN type control transistor through a variable resistor and the output of the control transistor is applied to the base electrode of the driving transistor through an NPN type amplifier transistor. A capacitor is connected between the base and emitter electrodes of the control transistor for smoothing the voltage applied to the base electrode of the control transistor. The sensitivity of the speed control system can be improved by connecting a Zener diode in the input circuit to the control transistor. Further the effect of the variation in the ambient temperature can be compensated for by using a thermister.

29 Claims, 12 Drawing Figures

ELECTRONIC SPEED CONTROL SYSTEMS FOR MINIATURE DIRECT CURRENT MOTORS

BACKGROUND OF THE INVENTION

This invention relates to an electronic speed control device for a miniature direct current motor suitable for driving light loads such as cassette or cartridge type tape recorders or record players.

Although various types of miniature direct current motors have been proposed in the past it is still impossible to obtain miniature direct current motors having small size, light weight, operating stably and inexpensive. One example of the prior art arrangement is shown in FIG. 1 and comprises a combination of a DC motor 10 and an AC tachometer generator 11. More particularly, motor 10 and generator 11 are mounted on a common shaft, not shown, so that the generator 11 produces an output proportional to the speed of the motor 10. The output from generator 11 is rectified by a diode 12. The output from diode 12 is smoothed by a capacitor 13 and the terminal voltage thereof is impressed upon the base electrode of a transistor 14. The output from transistor 14 is applied to the base electrode of a transistor 15 which is connected in series with the armature winding of motor 10. There are provided resistors 17 and 18 and a variable resistor 19 connected in parallel with capacitor 13.

The circuit shown in FIG. 1 operates as follows. When motor 10 rotates, the generator 11 produces an output voltage proportional to the speed of the motor. When the speed of the motor rises to a predetermined value, the output from generator 11 turns ON the transistor 14 thereby decreasing the collector potential thereof. Accordingly, the base potential of transistor 15 is lowered to decrease the emitter current thereof thereby decreasing the speed of motor 10. When the speed of motor 10 decreases, the output voltage of generator 11 also decreases with the result that transistors 14 and 15 operate in a manner opposite to that described above thereby increasing the motor speed. In this manner, the motor speed is regulated to a definite value. Such prior art system is disclosed in the specification of Japanese Patent No. 406479, for example.

With such construction, however, use of generator 11 increases the cost, weight and size of the motor assembly.

According to another prior art arrangement, as disclosed in the specification of United States Patent No. 2,814,012, the armature winding of a DC motor is connected in one arm of a resistance bridge circuit and the output of the bridge circuit is used to control the power supplied to the bridge circuit. With this construction, however, since the armature winding of the motor is used as one arm of the bridge circuit, the variation in the contact resistance between the brush and the commutator of the motor and the variation in the armature winding resistance due to temperature rise in the DC motor 10 being in use affect the balancing condition of the bridge circuit thereby rendering it difficult to obtain a stable constant speed. Although this problem can be solved by using noble metals for the brush and commutator, the use of noble metals increases the cost of the motor.

According to still another proposal, a brushless DC motor was used to obviate the problem caused by the variation in the contact resistance between the brush and commutator, but the circuit construction of the brushless motor is complicated and expensive so that the brushless motor is used in only high grade appliances where cost is not the problem.

SUMMARY OF THE INVENTION

Accordingly, it is an object of this invention to provide an improved electronic speed control system for a DC motor which is small, light weight, inexpensive and operates stably.

Another object of this invention is to provide a novel electronic speed control system for a DC motor including means for eliminating ripples from the control signal for a DC motor thereby assuring more stable speed control.

Still another object of this invention is to provide an improved speed control device for a DC motor capable of effectively controlling the speed of the motor.

Yet another object of this invention is to provide an improved speed control system for a miniature DC motor capable of preventing hunting of the motor speed.

A further object of this invention is to provide a novel speed control system for a DC motor capable of controlling the motor speed without being affected by the variation in the ambient temperature.

According to this invention these and other objects can be accomplished by providing an electronic speed control system for miniature direct current motor comprising a first bipolar transistor of the first type, second and third bipolar transistors of the second type, a source of supply having first and second terminals, means for connecting the emitter electrode of the first transistor to the first terminal of the source, means to connect the collector electrode of the first transistor to the second terminal of the source through the brush and commutator of the motor, means to connect the base electrode of the first transistor to the collector electrode of the second transistor, means to connect the emitter electrode of the second transistor to the second terminal of the source, means to connect the base electrode of the second transistor to the collector electrode of the third transistor, means to connect the collector electrode of the third transistor to the first terminal of the source through a first resistor, means to connect the emitter electrode of the third transistor to the second terminal of the source, means to connect the base electrode of the third transistor to the juncture between second and third resistors which are connected in series across the first and second terminals of the source, and means to connect the base electrode of the third transistor to the juncture between the collector electrode of the first transistor and the motor through a fourth resistor.

BRIEF DESCRIPTION OF THE DRAWINGS

Further objects and advantages of the invention can be more fully understood from the following detailed description taken in conjunction with the accompanying drawings in which.

DESCRIPTION OF THE PREFERRED EMBODIMENTS

Figure 1:
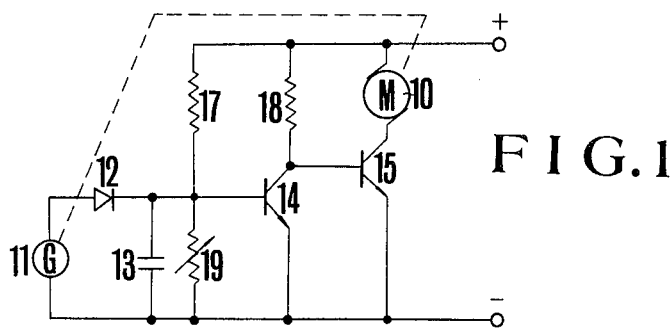
FIG. 1 is a connection diagram showing one example of a prior art electronic speed control system for a miniature DC motor system.
Figure 2:
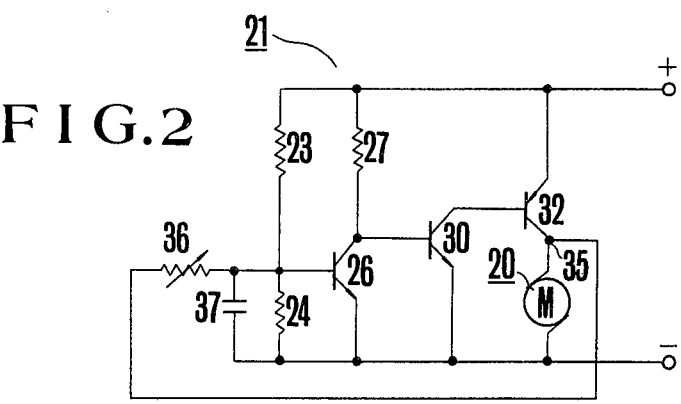
FIG. 2 is a connection diagram showing a miniature DC motor system provided with an electronic speed control device embodying the invention.

A preferred embodiment of this invention shown in FIG. 2 comprises a miniature DC motor 20 provided with brushes and a commutator, not shown. Accordingly, the motor 20 is provided with an armature winding wound on its rotor and connected to the terminals on the stator through the brushes and commutator. The motor may have three or more poles.

There is provided an electronic speed control device 21 including bias resistors 23 and 24 connected in series across the positive and negative terminals of a DC source, the juncture between resistors 23 and 24 being connected to the base electrode of an NPN type control transistor 26 for applying a predetermined bias potential to the base electrode. The emitter electrode of the control transistor 26 is connected directly to the grounded negative terminal of the DC source, while the collector electrode is connected to the positive terminal of the DC source via a load resistor 27. Further, the collector electrode of the control transistor 26 is connected to the base electrode of an NPN type amplifier transistor 30 having an emitter electrode connected to the ground and a collector electrode connected to the base electrode of a PNP type driving transistor 32. The emitter electrode of this driving transistor is connected to the positive terminal of the DC source, whereas the collector electrode is connected to one terminal of the motor 20. The other terminal of motor 20 is connected to the negative terminal of the DC source whereby the motor and the emitter-collector circuit of the driving transistor 32 are connected in series across the DC source. The juncture 35 between the collector electrode of the driving transistor 32 and the motor 20 is connected to the base electrode of the control transistor 26 through a variable control resistor 36. A capacitor 37 is connected between the base electrode of the control transistor 26 and the negative terminal of the DC source.

The embodiment shown in FIG. 2 operates as follows: When the positive and negative terminals of the DC source are energized, current flows through a circuit including resistor 27 and the base-emitter path of the amplifier transistor 30 thus turning it ON. Consequently, current flows through the emitter-base path of the driving transistor 32 turning it ON with the result that motor 20 is energized. As the motor rotates, a back electromotive force proportional to the speed of the motor is induced across the terminals of the motor, which is applied to the base electrode of the control transistor 26 via control resistor 36. When the motor 20 accelerates to a predetermined speed, current flows through the base-emitter path of the control transistor 26 which has been maintained OFF by the base bias potential. Accordingly, the control transistor 26 is turned ON for passing collector current which produces a voltage drop across resistor 27 thereby decreasing the collector potential of the control transistor 26. This reduces the base potential of the amplifier transistor 30, thus turning if OFF, which in turn turns OFF the driving transistor 32. As a result of this operation, the speed of the motor 20 begins to decrease and such decrease continues until the control transistor 26 is turned OFF. In other words, when the voltage induced across the terminals of the motor 20 in proportion to the speed thereof reduces below the threshold level of the control transistor 26 this transistor will be turned OFF. Then, the amplifier transistor 30 and the driving transistors are turned ON again. Thus, the speed of the motor 20 is maintained at a predetermined constant value. The normal speed of the motor of this type is 2000 R.P.M. for example, which can be adjusted by varying the control resistor 36. The purpose of capacitor 37 is to make flat the signal applied to the control transistor 26. The capacitance of capacitor 37 may be relatively small, 0.01 $\mu$F for example. Because, if the capacity of capacitances 37 were too large the response speed of the speed control would be decreased. When the number of poles of the motor 20 is three, its output voltage contains a substantial amount of ripple so that it is advantageous to use capacitor 37.

In the circuit construction of this embodiment the collector electrode of the amplifier transistor 30 is connected directly to the base electrode of the driving transistor 32 without utilizing a constant load resistor. Because, if a load resistor were connected to the amplifier transistor 30, current will flow through the load resistor when transistor 30 is turned ON and because it is necessary to consider the current flowing through the load resistor as one of the parameters for determining the speed of the motor 20. Where such load resistor is not used the load of the amplifier transistor 30 is constituted by only the driving transistor 32 and the motor 20 so that it is possible to improve the gain than the case utilizing the load resistor. Where the load resistor is eliminated, it is possible to increase the potential difference across the source than the case where the load resistor is used so that it is possible to increase the gain of the amplifier transistor 30 and driving transistor 32.

Figure 12:
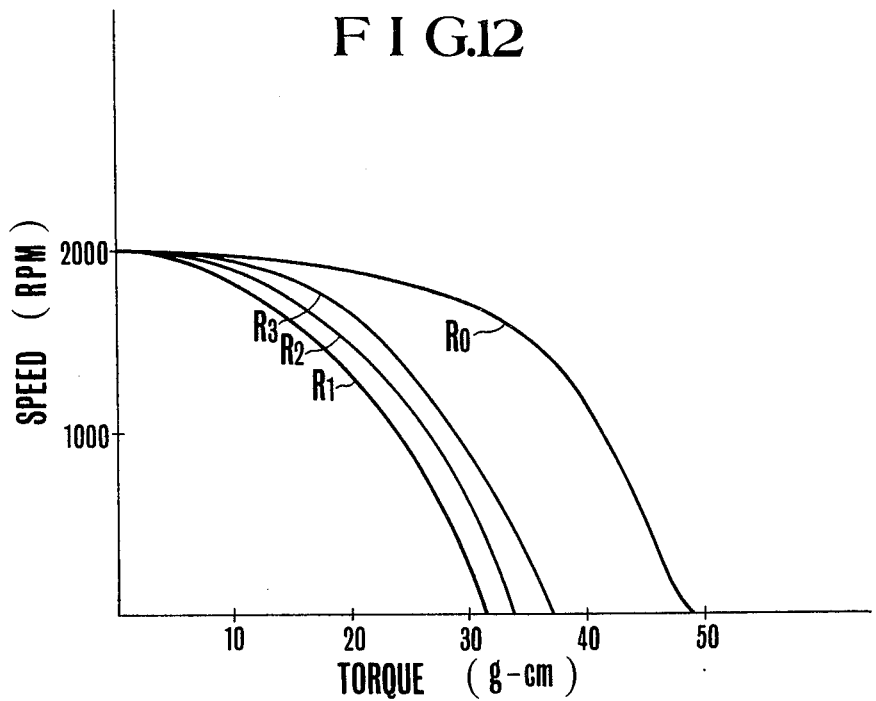
FIG. 12 is a graph showing the speed-torque characteristics obtainable from the circuit of the invention as shown in FIG. 3 and a circuit in which an amplifier transistor is loaded with a fixed resistor.

FIG. 12 shows speed-torque characteristics in which speed-torque characteristics (curves $R_1$, $R_2$ and $R_3$) with the amplifier transistor 30 loaded with a resistor between its collector and the positive terminal of the source are comparable with those (curve $R_o$ obtainable from the invention) with the amplifier transistor 30 dispensed with the load. It will be appreciated from the figure that the invention markedly improves the speed-torque characteristics as shown at curve $R_o$ as compared with the construction in which the amplifier transistor 30 is loaded with resistors each having resistances $r_1$, $r_2$ and $r_3$ ($r_1 < r_2 < r_3$), resulting in the curves $R_1$, $R_2$ and $R_3$, respectively. Further, the invention can reduce the acceleration time, required for the DC motor to reach a predetermined speed, by ⅓ so that the response characteristics of the D.C. motor is improved.

Figure 3:
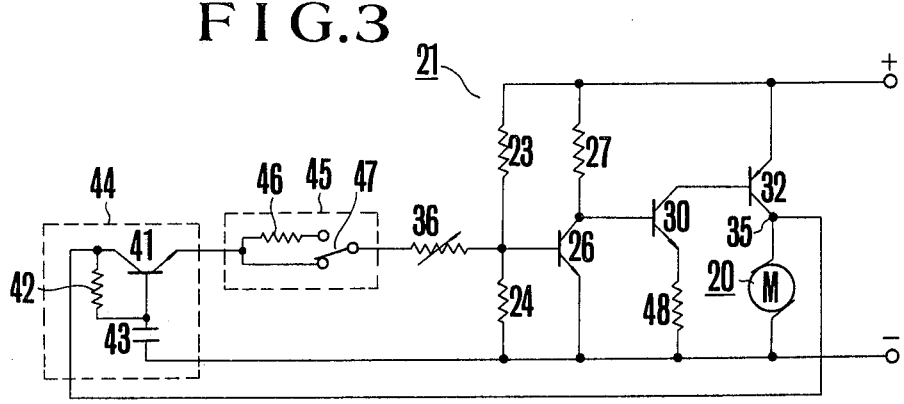
FIGS. 3 and 4 are connection diagrams showing modifications of the system shown in FIG. 2.

The modification shown in FIG. 3 is different from that shown in FIG. 2 in that the smoothing action of the capacitor 37 is provided by a filter circuit 44 constituted by an NPN transistor 41, a resistor 42 and a capacitor 43 in which the resistor 42 and the capacitor 43 are connected in series, one end of the resistor 42 is connected to the collector electrode of transistor 41 and to the juncture between the collector electrode of the driving transistor 32 and the DC motor 20. One terminal of the capacitor 43 is connected to the negative terminal of the DC source, and the juncture between the resistor 42 and the capacitor 43 is connected to the base electrode of transistor 41. The emitter electrode of this transistor is connected to one end of the control resistor 36 via a transfer circuit 45 to be described later. When the filter circuit described above is used the apparent capacity of the capacitor 43 as seen from the side of the emitter electrode of transistor 41 is expressed by the product between the current amplification factor of transistor 41 and the capacitance of the capacitor 43 so that it is possible to use capacitor 43 having smaller capacity than capacitor 37 shown in FIG. 2.

The switching circuit 45 is connected between the filter circuit 44 and the control resistor 36 and comprises a transfer switch 43 utilized to connect the emitter electrode of transistor 41 either directly or through a resistor 46 to the control resistor 36. When transfer switch 47 is thrown to the resistor 46 the amount of feedback of the control signal to the control transistor 26 decreases so that it is possible to increase the speed of the motor 20 than the case wherein the switch 47 is thrown to the other side. Where the DC motor system of this invention is applied to a magnetic tape recorder, and when the transfer switch 47 is thrown to the lower contact for directly connecting the emitter electrode of transistor 41 to the control resistor 36 the motor 20 operates at a constant normal speed whereas when the transfer switch 47 is thrown to the side of resistor 46, the control input to the control transistor 26 is decreased or the control thereof becomes ineffective with the result that the motor 20 runs at a higher speed thus providing a rapid feeding of the tape. A resistor 48 is connected between the emitter electrode of the amplifier transistor 30 and the negative terminal of the source for stabilizing the control. In other words, this resistor 48 adjusts the amplification factor of the amplifier transistor 30 to stabilize the operation of the circuit thus preventing hunting. The value of this resistor 48 is selected to a suitable value in accordance with the condition of the circuit.

Figure 4:
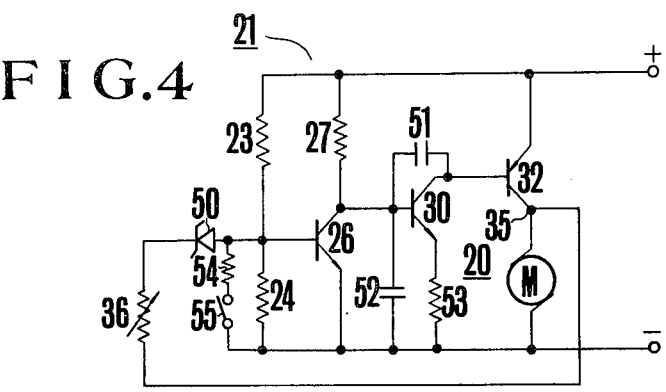

FIG. 4 shows another embodiment of the invention which is different from that shown in FIG. 2 in that a Zener diode 50 is connected between the variable control resistor 36 and the base electrode of the control transistor 26. If the voltage induced across the terminals of the DC motor 20 when it runs at the rated constant speed is made to be equal to the Zener voltage of the Zener diode 50, due to the steep voltage-current characteristic of the Zener diode, even a small variation in the induced voltage caused by a small variation in the motor speed results in a large variation in the motor current, thus improving the sensitivity of the control system.

Figure 5:
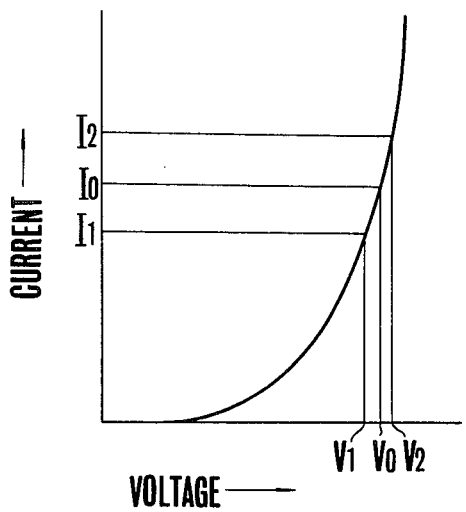
FIG. 5 is a graph showing the current-voltage characteristic of the Zener diode utilized in the system shown in FIG. 4.

More particularly, suppose now that, the DC motor 20 is running at a predetermined constant speed, that the voltage impressed across the Zener diode and the current flowing there through are represented by $v_o$ and $I_o$ (See FIG. 5) respectively, and that the motor speed increases for some reason. As the motor speed increases its terminal voltage increases correspondingly so that the voltage impressed across the Zener diode 50 increases also to $V_2$. Accordingly, the current flowing through the Zener diode increases rapidly to $I_2$ due to the non-linear characteristic thereof. Accordingly, the base potential of the control transistor 26 increases rapidly thus lowering the collector potential of the transistor 26 as well as the base potential of the amplifier transistor 30. This increases the collector potential of transistor 30 as well as the emitter-collector voltage of the driving transistor 32 thus decreasing the voltage supplied to the motor 20. Consequently, the motor speed is decreased. In this manner the voltage applied to the motor is maintained at a constant value with the result that the motor operates stably at the predetermined constant speed.

Conversely when the motor speed decreases, its induced voltage decreases so that the voltage impressed across the Zener diode 50 decreases to $V_1$ thus rapidly decreases the Zener current to $I_1$. As a consequence by the operation of the circuit which is opposite to that performed when the motor speed increases the voltage supplied to the motor is increased and the motor speed increases. Again, the voltage supplied to the motor is maintained at the constant value thus running it at the predetermined constant speed. As can be noted from the foregoing description, the variation in the motor speed is quickly detected by utilizing the non-linear characteristic of the Zener diode so that the accuracies of detecting the variation in the motor speed and of the speed control thereof are greatly improved. Moreover, as the Zener diode 50 and the base electrode of the control transistor 26 are connected in opposite polarities it is possible to compensate for the temperature variation without using any additional temperature compensating device. Capacitors 51 and 52 are used to prevent a parasitic oscillation of the speed control system and may have capacities of 0.03 $\mu F$ and 0.1 $\mu F$, respectively. Further, the circuit shown in FIG. 4 is different from that shown in FIG. 2 in that a resistor 53 is connected between the emitter electrode of the amplifier transistor 30 and the negative terminal of the DC source. The resistor 53 functions in the same manner as the resistor 48 shown in FIG. 3.

As shown in FIG. 4, a resistor 54 and a switch 55 are connected in series, the series connection being parallel with the bias resistor 24 for control transistor 26. With the switch 55 closed, the base potential of control transistor 26 is lowered so that the DC motor 20 is decelerated in relation to the speed for the switch 55 opened. The control circuit shown in FIG. 4 prevents the DC motor 20 from being unstabled when the transfer switch is thrown since the switch 47 of transfer circuit 45 is inserted in the feedback loop. The switch 47 is needed to be of a two-contact type in the embodiment of FIG. 3, but the switch 54 of FIG. 4 can be a usual ON-OFF switch which is of low cost. Obviously, the series connection of the resistor and switch may be connected in parallel with the resistor 23.

Figure 6:
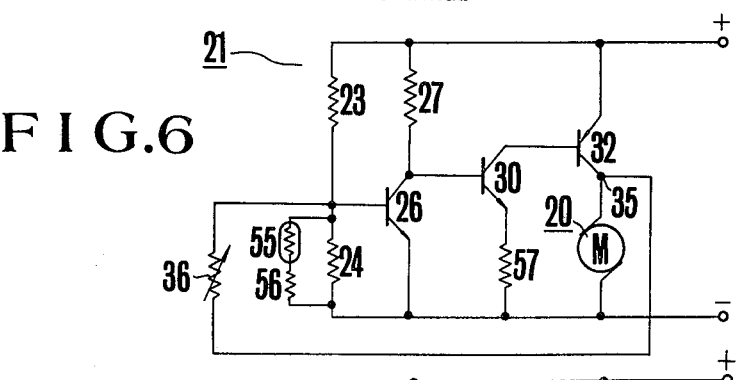
FIGS. 6 and 7 are connection diagrams showing still another modification of the system shown in FIG. 2.

FIG. 6 shows still another embodiment of this invention which is different from that shown in FIG. 2 in that a circuit including a resistor 26, a thermister 55 and a resistor which are connected in series across the resistor 26 is connected between the base electrode of the control transistor 26 and the negative terminal of the DC source. With this connection, when the ambient temperature rises, the internal resistance of the thermister decreases thus decreasing the composite resistance between the base electrode of control transistor 26 and the negative terminal of the DC source. Accordingly, the base potential of the control transistor 26 decreases thus turning OFF this transistor, whereby the motor speed is increased. The internal resistance of the transistor 26 between its base and emitter electrodes decreases as the ambient temperature rises, thus increasing the base current of the transistor 26. This turns ON transistor 26 so as to decrease the motor speed. Accordingly, it is possible to provide a flat temperature characteristic when the temperature-resistance characteristic of the composite resistance including thermister 55 is selected so as to cancel the variation in the base-emitter resistance. The value of the composite resistance is selected to be much smaller than that of the resistor 23 so that any variation in the characteristics of the thermister will not affect the accuracy of the speed control. The resistor 56 may be omitted depending upon the extent of temperature compensation. A resistor 57 connected between the emitter electrode of the amplifier transistor 30 and the negative terminal of the source functions in the same manner as the resistor 48 shown in FIG. 3.

Figure 7:
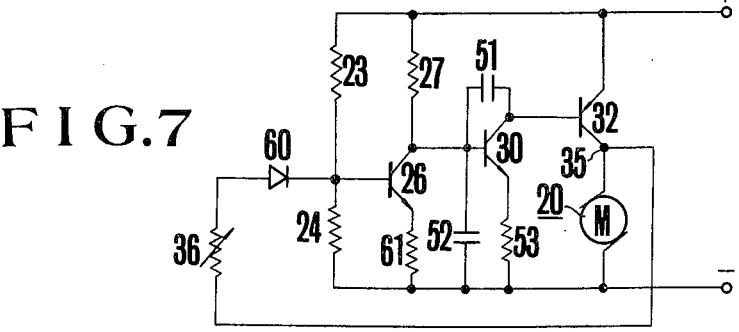
Figure 8:
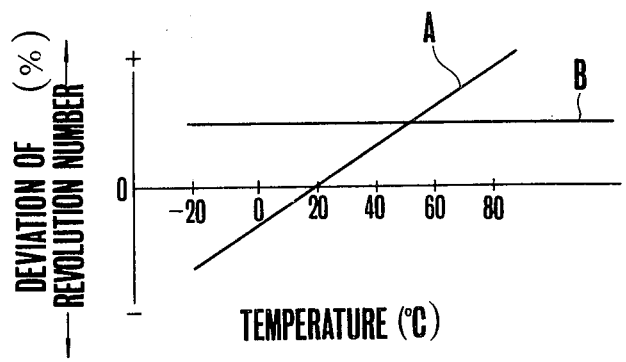
FIG. 8 is a graph showing the relationship between the deviation of the motor speed and the temperature, which is useful to explain the operation of the diode shown in FIG. 8.

In another embodiment of this invention shown in FIG. 7 the Zener diode 50 shown in FIG. 4 is substituted by a diode 60 which is connected in the forward direction with respect to the feedback signal. This circuit too is constructed to provide a temperature compensation similar to that of the circuit shown in FIG. 6, so that as the ambient temperature increases the base-emitter resistance of the control transistor 26 decreases. Accordingly, emitter current flows through resistor 61 to increase the voltage drop across this resistor. This increases the voltage across the base and emitter electrodes of the control transistor 26, thus turning OFF the same. Consequently, the speed of the motor 20 tends to increase with the increase in the temperature as shown by the characteristic A shown in FIG. 8. However, since the internal resistance of the diode 60 decreases with the temperature rise to increase the input to the control transistor 26 thereby tending to decrease the motor speed. For this reason, by utilizing the circuit shown in FIG. 7 it is possible to maintain the motor speed at a constant speed irrespective of the temperature rise as shown by the characteristic B shown in FIG. 8. Thus, the circuit shown in FIG. 7 can regulate the motor speed more correctly than the circuit utilizing a thermister as shown in FIG. 6 when the ambient temperature varies. Since a diode generally has a temperature coefficient of about −2.5 mV/° C, it is possible to compensate for the temperature characteristics of the motor 20 and the speed control system 21 by the temperature characteristic of the diode 60. In addition to the compensation for the variation in the ambient temperature it is also possible to prevent the drift of the motor speed caused by the temperature rise of the component parts which occurs when the circuit operates for a predetermined interval. It should be understood that the number of the diodes 60 may be varied in accordance with the extent of temperature compensation.

Figure 9:
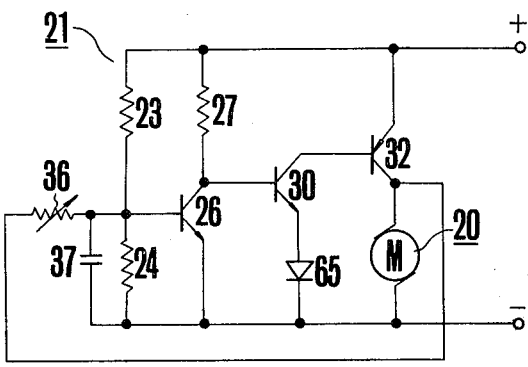
FIGS. 9 and 10 are diagrams showing still another embodiments of this invention.

FIG. 9 shows still another embodiment of this invention wherein a diode 65 is connected in the forward direction between the collector electrode of the amplifier transistor 30 and the negative terminal of the DC source. Since diode 65 has an internal resistance of 10 to 20 ohms the current from the base electrode of the driving transistor 32 decreases than a case where the diode 65 is not used thereby preventing the parasitic oscillation of the amplifier transistor 30 as well as the hunting of the motor speed. It is also possible to provide a temperature compensation. More particularly, as has been described above, the control transistor 26 is turned ON as the temperature increases thus tending to turn OFF the amplifier transistor 30. However, as the internal resistance of the diode 65 decreases, the amplifier transistor 30 is prevented from being turned OFF. These two operations cancel with each other thus maintaining the motor speed at a constant speed irrespective of the temperature rise. Generally, as the diode 65 has a temperature coefficient of about −2.5 mV/° C it is possible to compensate for the temperature variation of the speed control device by causing the temperature characteristics of the motor 20 and of the speed control device and that of the diode to cancel with each other. As before, it is possible to use diodes 65 of any number.

Figure 10:
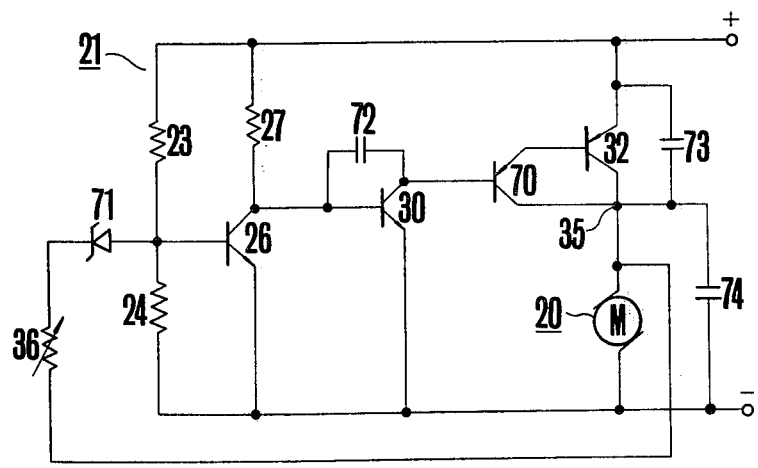
Figure 11:
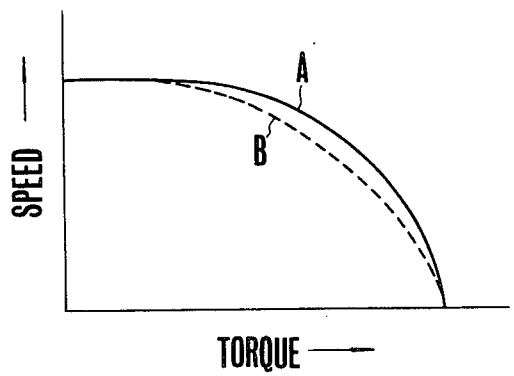
FIG. 11 shows the speed-torque characteristic of a DC motor useful to explain the operation of the embodiment shown in FIG. 10.

The embodiment shown in FIG. 10 is different from that shown in FIG. 2 in that a PNP transistor 70 is connected between the amplifier transistor 30 and the driving transistor 32, the transistor 70 being connected in a Darlington scheme with respect to the driving transistor 32. More particularly, the base electrode of transistor 70 is connected to the collector electrode of the amplifier transistor 30, the emitter electrode is connected to the base electrode of the driving transistor 32 and the collector electrode is connected to the collector electrode of the driving transistor 32. With this connection, where the current amplification factors of transistors 70 and 32 are denoted by $\beta_1$ and $\beta_2$ respectively, the overall current amplification factor of these transistors will be expressed by $\beta_1.\beta_2$. In other words the current supplied to the motor 20 through the base electrode of transistor 70 will be multiplied by a factor $\beta_1.\beta_2$. For this reason, it is possible to accurately detect any small variation in the terminal voltage of the motor 20 thus increasing the gain of the control loop. Accordingly, it is possible to improve the speed-torque characteristic from curve B of the prior art control system to curve A shown in FIG. 11. Thus, the voltage supplied to the motor is maintained at a constant value thereby driving it at a constant speed. Further, with this arrangement it is possible to decrease the acceleration time of the motor by about 0.3 sec. than the prior art control system and to decrease the load variation by about 1.5%. Accordingly it is not necessary to provide for the rotor any special means for reducing the acceleration time. Since transistor 70 utilized in this embodiment may be of the standard design, addition thereof does not result in any substantial increase of the cost. Although the embodiment shown in FIG. 10 is different from that shown in FIG. 2 in that a Zener diode 71 is connected between variable resistor 36 and the base electrode of control transistor 26, since the Zener diode 71 operates in the same manner as the Zener diode 50 shown in FIG. 4, the detailed description of the embodiment shown in FIG. 10 will not be made. Further, the capacitor 72 connected between the base and collector electrodes of the amplifier transistor 30 functions to prevent the parasitic oscillation of the speed control system in the same manner as the capacitor 51 shown in FIG. 4. A damper capacitor 73 having a capacity of about several microfards is connected between the emitter and collector electrodes of the driving transistor 32. Further a capacitor 74 having a capacity of about 0.1 $\mu$F is connected in parallel with the motor 20 for the purpose preventing the spark between the brush and commutator of the motor.

It should be understood that the invention is not limited to the specific embodiments illustrated and that many changes and modifications will readily occur to one skilled in the art. For example, PNP type transistors may be used as the control transistor 26 and the amplifier transistor 30, and a NPN type transistor may be used as the driving transistor 32. Capacitors 73 and 74 shown in FIG. 10 can also be used in other circuits.

What is claimed is:

1. An electronic speed control system for a miniature direct current motor comprising a first bipolar transistor of the first type, second and third bipolar transistors of the second type, a source of supply having first and second terminals, means for connecting the emitter electrode of the first transistor to the first terminal of the source, means to connect the collector electrode of the first transistor to the second terminal of said source through the brush and commutator of said motor, means to connect the base electrode of said first transistor to the collector electrode of said second transistor, means to connect the emitter electrode of the second transistor to the second terminal of the source, means to connect the base electrode of the second transistor to the collector electrode of the third transistor, means to connect the collector electrode of the third transistor to the first terminal of the source through a first resistor, means to connect the emitter electrode of the third transistor to the second terminal of the source, means to connect the base electrode of the third transistor to the juncture between second and third resistors which are connected in series across the first and second terminals of the source, and means to connect the base electrode of the third transistor to the juncture between the collector electrode of the first transistor and said motor through a fourth resistor.

2. The speed control system according to claim 1 which further comprises a filter circuit connected between the juncture between the collector electrode of said first transistor and said motor and the base electrode of said third transistor for eliminating the ripple in the voltage induced in the DC motor.

3. The speed control system according to claim 2 wherein said filter circuit comprises a first capacitor connected in parallel with said third resistor.

4. The speed control system according to claim 2 wherein said filter circuit comprises a fifth resistor, a second capacitor and a fourth bipolar transistor which are connected such that the capacitance of said second capacitor as seen from the output side of said fourth transistor is equal to a multiple of the current amplification factor of said fourth transistor.

5. The speed control system according to claim 4 wherein said fourth transistor is an NPN type transistor, the collector-emitter path of said fourth transistor is connected between the juncture between the collector electrode of said first transistor and said motor, and one end of said fourth resistor, the base electrode of said fourth transistor is connected to the second terminal of said source through said second capacitor, and said fifth resistor is connected between the collector and base electrode of said fourth transistor.

6. The speed control system according to claim 5 which further comprises a transfer circuit connected between the emitter electrode of said fourth transistor and said fourth resistor for switching the speed of said DC motor among a plurality of preset values.

7. The speed control system according to claim 6 which further comprises a sixth resistor connected between the emitter electrode of said second transistor of the second type and the second terminal of the source.

8. The speed control system according to claim 1 which further comprises a sixth resistor connected between the emitter electrode of said second transistor of the second type and the second terminal of said source.

9. An electronic speed control system for a miniature direct current motor comprising a first bipolar transistor of the first type, second and third bipolar transistors of the second type, a source of supply having first and second terminals, means to connect the emitter electrode of said first transistor to the first terminal of the source, means to connect the collector electrode of said first transistor to the second terminal of the source via the brush and commutator of said motor, means to connect the base electode of said first transistor to the collector electrode of said second transistor, means to connect the emitter electrode of said second transistor to the second terminal of said source, means to connect the base electrode of said second transistor to the collector electrode of said third transistor, means to connect the collector electrode of said third transistor to the first terminal of said source via a first resistor, means to connect the emitter electrode of said third transistor to the second terminal of said source, and means to connect the base electrode of said third transistor to the juncture between second and third resistors which are connected in series across the first and second terminals of said source and to the juncture between the collector electrode of said first transistor and said direct current motor by serially connecting Zener diode and a fourth resistor.

10. The speed control system according to claim 1 which further comprises a third capacitor connected between the collector and base electrodes of said second transistor.

11. The speed control system according to claim 10 which further comprises a fourth capacitor connected between the base electrode of said second transistor and the second terminal of said source.

12. The speed control system according to claim 9 which further comprises a third capacitor connected between the collector and base electrodes of said transistor, a fourth capacitor connected between the base electrode of said second transistor and the second terminal of said source and a sixth resistor connected between the emitter electrode of said second transistor and the second terminal of said source.

13. An electronic speed control system for a miniature direct current motor comprising a first bipolar transistor of the first type, second and third transistors of the second type, a source of supply having first and second terminals, means to connect the emitter electrode of said first transistor to the first terminal of said source, means to connect the collector electrode of said first transistor to the second terminal of said source through the brush and commutator of said motor, means to connect the base electrode of said first transistor to the collector electrode of said second transistor, means to connect the emitter electrode of said second transistor to the second terminal of said source, means to connect the base electrode of said second transistor to the collector electrode of said third transistor, means to connect the collector electrode of said third transistor to the first terminal of said source through a first resistor, means to connect the emitter electrode of said third transistor to the second terminal of said source, means to connect the base electrode of said third transistor to the juncture between second and third resistors which are connected in series between the first and second terminals of said source and to the juncture between the collector electrode of said first transistor and said direct current motor through a fourth resistor, and a thermister connected in parallel with said third resistor.

14. The speed control system according to claim 13 which further comprises a seventh resistor connected between one terminal of said thermister and the second terminal of said source.

15. The speed control system according to claim 13 which further comprises a sixth resistor connected between the emitter electrode of said second transistor and the second terminal of said source.

16. An electronic speed control system for a miniature direct current motor comprising a first bipolar transistor of the first type, second and third bipolar transistors of the second type, a source of supply having first and second terminals, means to connect the emitter electrode of said first transistor to the first terminal of said source, means to connect the collector electrode of said first transistor to the second terminal of said source through the brush and commutator of said motor, means to connect the base electrode of said first transistor to the collector electrode of said second transistor, means to connect the emitter electrode of said second transistor to the second terminal of said source, means to connect the base electrode of said second transistor to the collector electrode of said third transistor, means to connect the collector electrode of said third transistor to the first terminal of said source through a first resistor, means to connect the emitter electrode of said third transistor to the second terminal of said source, means to connect the base electrode of said third transistor to the juncture of second and third resistors connected in series across the first and second terminals of said source, and means to connect the juncture between the collector electrode of said first transistor and said motor to the base electrode of said third transistor through a fourth resistor and a first diode connected in the forward direction with respect to the signal passing therethrough.

17. The speed control system according to claim 16 which further comprises an eighth resistor connected between the emitter electrode of said third transistor and the second terminal of said source.

18. The speed control system according to claim 17 which further comprises a third capacitor connected between the collector and base electrodes of said second transistor, a fourth capacitor connected between the base electrode of said second transistor and the second terminal of said source and a sixth resistor connected between the emitter electrode of said second transistor and the second terminal of said source.

19. The speed control system according to claim 1 which further comprises a second diode connected between the emitter electrode of said second transistor and the second terminal of said source in the forward direction.

20. An electronic speed control system for a miniature direct current motor, comprising a first bipolar transistor of the first type, second and third bipolar transistors of the second type, a fourth bipolar transistor of the first type, a source of supply having first and second terminals, means to connect the emitter electrode of the first transistor to the first terminal of said source, means to connect the collector electrode of said first transistor to the second terminal of said source through the brush and commutator of said motor, means to connect the base electrode of said first transistor to the emitter electrode of said fourth transistor which is connected in a Darlington scheme with respect to said first transistor, means to connect together the collector electrodes of said first and fourth transistors, means to connect the base electrode of said fourth transistor to the collector electrode of said second transistor, means to connect the emitter electrode of said second transistor to the second terminal of said source, means to connect the base electrode of said second transistor to the collector electrode of said third transistor, means to connect the collector electrode of said third transistor to the first terminal of said source through a first resistor, means to connect the emitter electrode of said third transistor to the second terminal of said source, and means to connect the base electrode of said third transistor to the juncture between the second and third resistors serially connected across the first and second terminals of said source and to the juncture between the collector electrode of said first transistor and said motor through a fourth resistor.

21. The speed control system according to claim 20 which further comprises a Zener diode connected between said fourth resistor and the base electrode of said third transistor.

22. The speed control system according to claim 21 which further comprises a third capacitor connected between the collector and base electrodes of said second transistor.

23. The speed control system according to claim 22 which further comprises a fifth capacitor connected between the collector and emitter electrodes of said first transistor.

24. The speed control system according to claim 23 which further comprises a sixth capacitor connected in parallel with said motor.

25. The speed control system according to claim 1 which further comprises a fifth capacitor connected between the collector and emitter electrodes of said first transistor.

26. The speed control system according to claim 25 which further comprises a sixth capacitor connected in parallel with said motor.

27. The speed control system according to claim 1 wherein series connection circuit means of a resistor and a switch is connected in parallel with said third resistor, said switch being adapted to change the speed of motor.

28. The speed control system according to claim 9 wherein series connection circuit means of a resistor and a switch is connected in parallel with said third resistor, said switch being adapted to change the speed of motor.

29. An electronic speed control system for a miniature direct current motor comprising a first bipolar transistor of the first type, second and third bipolar transistors of the second type, a source of supply having first and second terminals, means for connecting the emitter electrode of the first transistor to the first terminal of the source, means to connect the collector electrode of the first transistor to the second terminal of said source through the brush and commutator of said motor, means to connect the base electrode of said first transistor to the collector electrode of said second transistor, means to connect the emitter electrode of the second transistor to the second terminal of the source, means to connect the base electrode of the second transistor to the collector electrode of the third transistor, means to connect the collector electrode of the third transistor to the first terminal of the source through a first resistor, means to connect the emitter electrode of the third transistor to the second terminal of the source, means to connect the base electrode of the third transistor to the juncture between second and third resistors which are connected in series across the first and second terminals of the source, means to connect the base electrode of the third transistor to the juncture between the collector electrode of the first transistor and said motor through a fourth resistor, and series connection circuit means of a resistor and a switch for changing the bias to the third transistor.

* * * * *